United States Patent
Peng et al.

(10) Patent No.: US 9,781,249 B2
(45) Date of Patent: Oct. 3, 2017

(54) METHOD AND SYSTEM FOR DISPLAYING UNREAD MESSAGE

(71) Applicant: Tencent Technology (Shenzhen) Company Limited, Shenzhen, Guangdong (CN)

(72) Inventors: Changhu Peng, Shenzhen (CN); Shichao Liu, Shenzhen (CN); Haibo Xu, Shenzhen (CN); Mingli Dong, Shenzhen (CN); Yong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 501 days.

(21) Appl. No.: 14/282,988

(22) Filed: May 20, 2014

(65) Prior Publication Data
US 2014/0256295 A1    Sep. 11, 2014

Related U.S. Application Data

(63) Continuation of application No. PCT/CN2012/083917, filed on Nov. 1, 2012.

(30) Foreign Application Priority Data

Nov. 25, 2011  (CN) .......................... 2011 1 0381829

(51) Int. Cl.
*H04M 1/725*  (2006.01)
*G06F 9/44*   (2006.01)
(Continued)

(52) U.S. Cl.
CPC ...... *H04M 1/72547* (2013.01); *G06F 3/0481* (2013.01); *G06F 3/0486* (2013.01); *G06F 3/0488* (2013.01); *G06F 9/4443* (2013.01)

(58) Field of Classification Search
CPC ........ G06F 9/44; G06F 3/0486; G06F 3/0481; G06F 3/0488; G06F 9/4443; H04M 1/72547
(Continued)

(56) References Cited

U.S. PATENT DOCUMENTS

2012/0272230 A1* 10/2012 Lee ............................... 717/173
2013/0050250 A1*  2/2013 Brinda et al. ................. 345/619
(Continued)

FOREIGN PATENT DOCUMENTS

CN       101345963    *  1/2009  ............ H04M 1/725
CN       101562651 A    10/2009
(Continued)

OTHER PUBLICATIONS

International Search Report for Application No. PCT/CN2012/083917 dated Feb. 14, 2013 in 4 pages.
(Continued)

*Primary Examiner* — Charles Shedrick
(74) *Attorney, Agent, or Firm* — Knobbe Martens Olson & Bear LLP

(57) ABSTRACT

Described is a method and system for displaying an unread message. The method for displaying an unread message includes: pulling an unread message in a lock screen state; and displaying a corresponding unread message application icon on a first active hotspot on a lock screen when an unread message exists, and otherwise, hiding the unread message application icon. The method for previewing an unread message includes: receiving information for activating an unread message application icon in a lock screen state, and displaying a detail entry containing a predetermined number of unread messages on a second active hotspot; dragging the unread message application icon to a third active hotspot to enter into a corresponding application main window, or
(Continued)

dragging the unread message application icon to the detail entry to enter into a message window corresponding to the detail entry.

10 Claims, 3 Drawing Sheets

(51) Int. Cl.
*G06F 3/0481* (2013.01)
*G06F 3/0488* (2013.01)
*G06F 3/0486* (2013.01)

(58) Field of Classification Search
USPC ............ 455/412.2; 717/173; 345/619; 705/3
See application file for complete search history.

(56) References Cited

U.S. PATENT DOCUMENTS

2014/0378099 A1* 12/2014 Huang et al. ................. 455/411
2015/0106121 A1* 4/2015 Muhsin et al. .................. 705/3

FOREIGN PATENT DOCUMENTS

| CN | 102109945 A | 6/2011 |
| CN | 102130999 A | 7/2011 |
| KP | 10-2011-0102880 | 9/2011 |

OTHER PUBLICATIONS

Office Action Issued in Korean Patent Application No. 10-2014-7016753, dated Sep. 30, 2015 in 7 pages.

* cited by examiner

METHOD AND SYSTEM FOR DISPLAYING UNREAD MESSAGE

This application is a continuation application of International Application No. PCT/CN2012/083917, filed Nov. 1, 2012, which claims the benefit of Chinese Patent Application No. 201110381829.7, filed on Nov. 25, 2011 and entitled "METHOD AND SYSTEM FOR DISPLAYING UNREAD MESSAGE." Each of these prior applications is incorporated herein by reference in its entirety.

TECHNICAL FIELD

The present disclosure relates to the communications field, and in particular, to a method and system for displaying an unread message.

BACKGROUND

Touch screen mobile phones can be operated by taping the touch screen using fingers instead of pressing on keyboards, and therefore have higher operability and are becoming more and more popular among people. Even with respect to a common touch screen mobile phone, a user can tap on the touch screen using fingers to operate various applications installed in the mobile phone. For example, the user may start a short message main window by a press-down, drag, or click operation.

Since the touch screen mobile phones are very sensitive to touch identification on the screen, the touch screen mobile phones are provided with a lock screen function. A touch detection element in mobile phones can detect a touch action on the entire screen only after the screen is unlocked. Generally, the user places a great concern to unread messages displayed on the screen of the mobile phone. Therefore, with respect to the touch screen mobile phone, it is generally pursued on the market as how to quickly browse unread messages.

Currently, a conventional technology of displaying an unread message is available. According to this technology, all application icons are hidden on the locked screen of the mobile phone, and a screen unlock button is only displayed and identifiable instead. After the screen of the mobile phone is unlocked, when an unread short message or a missed call exists, an application icon corresponding to the short message or missed call may be displayed on the screen of the mobile phone. The user needs to click the icon to enter a corresponding message or call main window. The main window displays a list of all read and unread short messages or a list of all incoming calls. The user opens a corresponding message window with respect to short messages or incoming calls only by clicking an entry in the list.

During the implementation of the present disclosure, the inventors find that the prior art has at least the following problems:

In the screen lock state, the screen unlock button is only displayed on the screen of the mobile phone, and whether an unread message exists may be determined only after the screen is unlocked, causing poor visuality. During reading of the unread message on the mobile phone, the user can only enter a main window containing an application corresponding to the unread message, and then click the detail entry of the unread message to enter a window of the detail entry of the unread message to read the unread message, causing inconvenience to reading of the unread message.

Accordingly, it is desirable to provide an improved technical solution to address the technical problem.

SUMMARY

The present disclosure is directed to providing a method and system for displaying an unread message. With the method and system, an unread message application icon may be directly displayed or activated in a lock screen state, which has no limitation to message preview; and in addition, in the lock screen state, an application main window or a message window may be displayed to a user by activating and sliding an unread message application icon, thereby achieving direct access to the message.

In view of the above, embodiments of the present disclosure provide a method and system for displaying an unread message. The technical solutions are as follows:

A method for displaying an unread message includes: pulling an unread message in a lock screen state; and displaying a corresponding unread message application icon on a first active hotspot on a lock screen when an unread message exists, and otherwise, hiding the unread message application icon.

Furthermore, the pulling an unread message includes: establishing an independent pull thread for each application; and pulling, using the pull thread, an unread message of a corresponding application.

Furthermore, the displaying a corresponding unread message application icon on a first active hotspot on a lock screen includes: displaying all unread message application icons on the first active hotspot if the number of unread message application icons is smaller than a predetermined number; and otherwise, displaying a predetermined number of unread message application icons on the first active hotspot, and pulling more unread message application icons by receiving information for activating screen-slide operation.

Furthermore, the method further includes:

receiving information for activating the unread message application icon in the lock screen state, and displaying a detail entry containing unread messages corresponding to a predetermined number of unread message application icon on a second active hotspot; and upon receiving first slide information of the unread message application icon from the detail entry, entering into a message window corresponding to the detail entry, the first slide information of the unread message application icon being generated by sliding the unread message application icon from the first active hotspot to the detail entry.

Furthermore, after the displaying a detail entry containing unread messages corresponding to a predetermined number of unread message application icon on a second active hotspot, the method further includes:

pre-reading next-screen unread messages using a background thread when previewing current-screen unread messages on the second active hotspot. Furthermore, the method further includes:

upon receiving second slide information of the unread message application icon on a first active hotspot, entering a corresponding application main window, the second slide information of the unread message application icon being generated by sliding the unread message application icon from the first active hotspot to the third active hotspot.

A system for displaying an unread message includes: an unread message pulling module, configured to pull an unread message in a lock screen state; and an unread message application icon displaying module, configured to:

display a corresponding unread message application icon on a first active hotspot on a lock screen when an unread message exists; and otherwise, hide the unread message application icon.

Furthermore, the unread message pulling module is configured to: establish an independent pull thread for each application; and pull, using the pull thread, an unread message of a corresponding application.

Furthermore, the unread message application icon displaying module is configured to: display all unread message application icons on the first active hotspot if the number of unread message application icons is smaller than a predetermined number; and otherwise, display a predetermined number of unread message application icons on the first active hotspot, and pull more unread message application icons by receiving information for activating screen-slide.

Furthermore, the system further includes: a message main window displaying module, configured to: receive information for activating the unread message application icon in the lock screen state, and display a detail entry containing unread messages corresponding to a predetermined number of unread message application icons on a second active hotspot; and upon receiving first slide information of the unread message application icon from the detail entry, enter into a message window corresponding to the detail entry, the first slide information of the unread message application icons being generated by sliding the unread message application icon from the first active hotspot to the detail entry.

Furthermore, the system further includes: a detailed item pre-reading module, configured to: when previewing current-screen unread messages on the second active hotspot, pre-read next-screen unread messages using a background thread.

Furthermore, the system further includes: a main window displaying module, configured to: upon receiving second slide information of the unread message application icon on a third active hotspot, enter into a corresponding application main window, the second slide information of the unread message application icon being generated by sliding the unread message application icon from the first active hotspot to the third active hotspot.

The technical solutions provided in the embodiments of the present disclosure achieve the following beneficial effects:

According to the method and system for displaying an unread message, an application icon containing unread message (i.e., unread message application icon) may be directly displayed on a first active hotspot in a lock screen state, and extra unread message application icons may be pulled by receiving information for activating screen-slide, enabling a user to acquire the unread message directly. In addition, the unread message application icons are pulled using multiple threads, thereby improving interface response speed. Further, an application main window or a message window may be entered into by directly dragging the unread message application icon to a third activate hotspot or a detail entry, thereby achieving direct access to the message. In this way, messages are browsed more quickly and reliably.

BRIEF DESCRIPTION OF THE DRAWINGS

For a better understanding of the technical solutions in the embodiments of the present disclosure, the accompanying drawings for illustrating the embodiments are briefly described below. Apparently, the accompanying drawings in the following description illustrate only some embodiments of the present disclosure, and persons of ordinary skill in the art may derive other accompanying drawings based on these accompanying drawings without any creative efforts.

DETAILED DESCRIPTION

To make the objectives, technical solutions, and advantages of the present disclosure clearer, the embodiments of the present disclosure are described in detail below with reference to the accompanying drawings.

The present disclosure provides a technique for displaying an unread message. According to the technique, an unread message application icon may be displayed on a predetermined active area in a lock screen state, and the unread message application icon may be activated by click or may be slid. In addition, information for activating the unread message application icon may be received in the lock screen state, and a detail entry corresponding to the activated unread message application icon is displayed on the predetermined active area to acquire message reading, or an application main window is got into by sliding the unread message application icon to another predetermined active area. For the specific process may be as illustrated in FIG. 1.

The subsequent embodiments of the present disclosure are described using a terminal device as an executing subject of the method for displaying an unread message as an example, where the terminal device may be, for example, a mobile phone, a personal computer, or a tablet computer etc.

Figure 1:
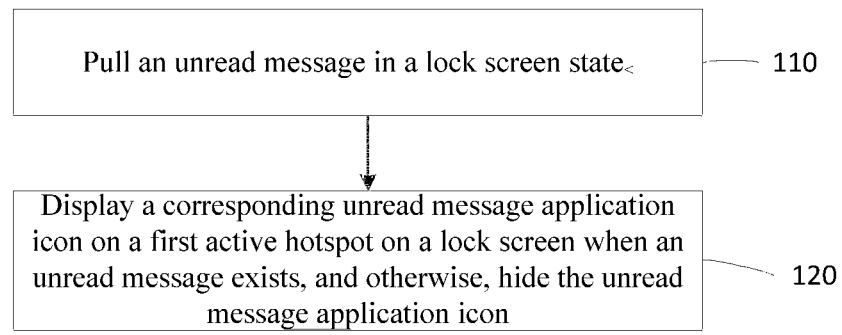
FIG. 1 is a flowchart of a method for displaying an unread message according to an embodiment of the present disclosure.

FIG. 1 is a flowchart of a method for displaying an unread message according to an embodiment of the present disclosure. The method includes the following steps:

Step 110: Pulling an unread message in a lock screen state.

The unread messages refer to messages that are tagged as unread in various applications or messages that fail to be pulled in a previous pull operation. In this embodiment, the specific applications to be pulled are not limited. unread messages in all installed applications may be pulled, or unread messages in specified applications of all installed applications may be pulled.

Figure 2:
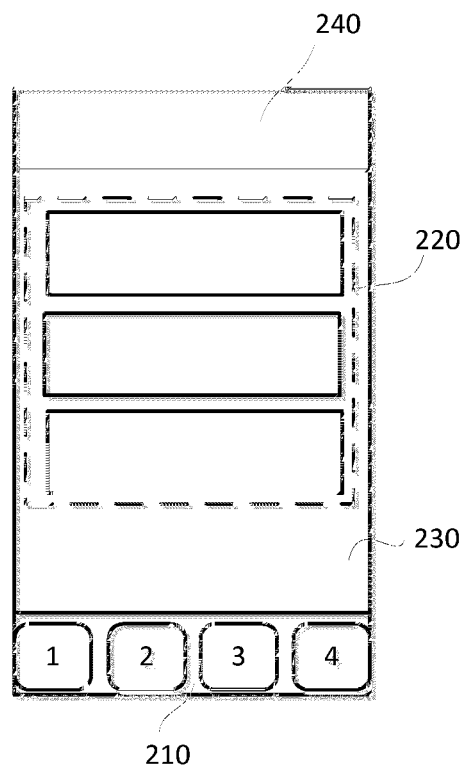
FIG. 2 is a schematic diagram of distribution of various hotspots defined on the screen of a mobile phone according to an embodiment of the present disclosure.

Generally, after the screen is locked, a touch operation on only a small region of the lock screen icon or unlock screen icon may be identified by the touch screen. Therefore, to ensure operability of the unread message application icon, herein active hotspot division and setting is performed with respect to the screen in the lock screen state such that a touch screen operation on the active hotspot in the lock screen state is identifiable. To be specific, in the lock screen state, the screen may be touched to activate the icon on the above set active hotspot. Referring to FIG. 2, it is shown a schematic diagram of distribution of various hotspots defined on the screen of a mobile phone according to an embodiment of the present disclosure. The various hotspots may be a first active hotspot 210, a second active hotspot 220, and a third active hotspot 230, and an area 240 may be set as an area that is inactivatable in the lock screen state. Nevertheless, in practice, the area occupied by each of the active hotspots may be adaptively reduced, such that the sum of the areas of the active hotspots is smaller than the area of the entire screen. In addition, besides the three active hotspots, other active hotspots may be set for other purposes.

The pulling an unread message specifically includes: establishing an independent pull thread for each application; and pulling, using the pull thread, an unread message corresponding to the application.

Figure 3:
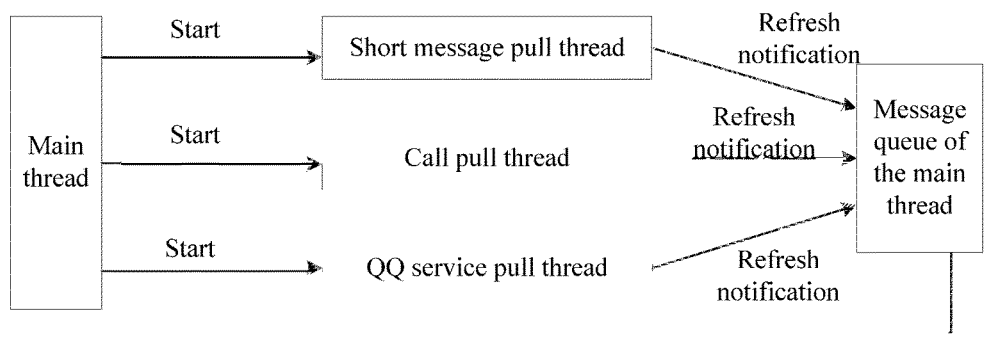
FIG. 3 is a schematic diagram of pulling unread messages using multiple threads according to an embodiment of the present disclosure.

In the lock screen state, a message queue is directly established using a main thread in the mobile phone, and an independent pull thread is established for each of the applications installed on the mobile phone, for example, a short message pull thread, a call pull thread, a QQ service pull thread, or the like. Referring to FIG. 3, when the screen is locked, the main thread starts enabling pull threads of various applications. When all unread messages of an application are pulled using pull thread of the application, the pull thread sends a message to the message queue of the main thread, thereby refreshing the message queue. Obviously, such a message pull mode has replaced a conventional message pull mode where only one pull thread is established to pull unread messages of applications one by one, which improves interface response speed.

Step 120: Displaying a corresponding unread message application icon on a first active hotspot on a lock screen when an unread message exists, and otherwise, hiding the unread message application icon.

Herein the first active hotspot may be the first active hotspot 210 illustrated in FIG. 2 which illustrates four unread message application icons. Nevertheless, during specific implementation, the first active hotspot 210 may also be set in another position on the screen of the mobile phone, for example, the middle part or the upper part on the screen, or even may be set on the left side or right side on the screen.

When the message queue of the main thread receives the message from the pull thread and analyzes the message, through analysis, if the message indicates that an unread message has been pulled, the main thread refreshes the interface to display a new interface, i.e., displaying the latest unread message application icon of the application with the unread message pulled on the interface; and if the message indicates that no unread message has been pulled, the main thread remains the original state, i.e., still hiding the corresponding unread message application icon. Therefore, if unread messages exist, a plurality of unread message application icons may be displayed on a captured screen after unread messages are completely pulled using all threads.

To improve visuality of the unread message application icon, the icon may be set as follows: when the number of unread messages of a specific type is larger than 0, displaying the application icon on the first active hotspot 210, and meanwhile displaying the number of unread messages at the upper-right corner of the icon; and when the number of unread messages is larger than 99, displaying N instead of the specific number of unread messages. Nevertheless, the position for displaying the number of unread messages may be flexibly set, and the minimum number represented by N may also be flexibly set.

Generally, when a mobile phone is installed with a large number of applications, many applications may have unread messages after the screen of the mobile phone is unlocked. However, the size of the screen is limited, and the size of the corresponding first active hotspot 210 is also limited. Therefore, for convenience of user's operations, when the number of unread message application icons is smaller than a predetermined number, all unread message application icons are displayed on the first active hotspot 210; otherwise, a predetermined number of unread messages are displayed on the first active hotspot 210, and more unread message application icons are pulled by a screen-slide operation.

Figure 4:
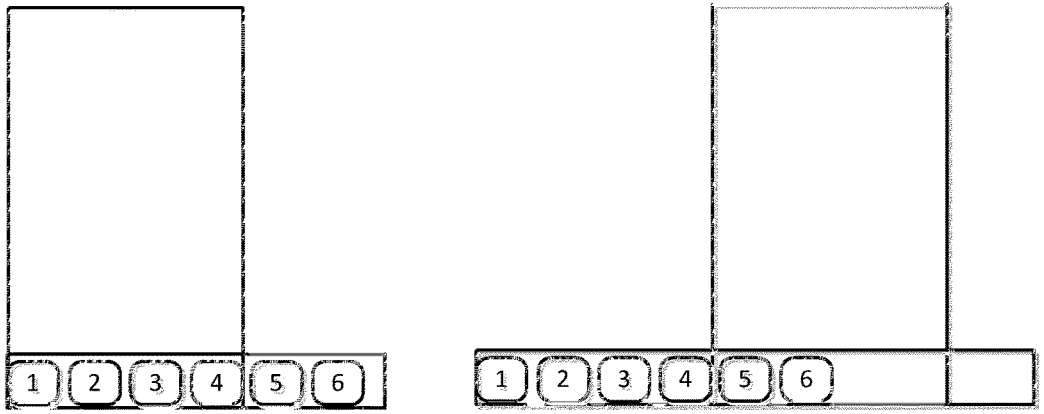
FIG. 4 is a schematic diagram of pulling an unread message application icon according to an embodiment of the present disclosure.

In other words, when the number of unread message application icons is smaller than the predetermined number, all unread message application icons are displayed on a first screen of the first active hotspot 210; when the number of unread message application icons is larger than the predetermined number, a predetermined number of unread messages are displayed firstly on the first screen for initial display of the first active hotspot 210. When the remaining unread message application icons need to be displayed, another predetermined number of unread message application icons may be pulled by a screen-slide operation. When the number of remaining unread message application icons is smaller than the predetermined number, the remaining unread message application icons are displayed once on last one screen. For example, the predetermined number of may be four; when there are six unread message application icons, display of the icons may referenced to FIG. 4, which schematically illustrates pulling an unread message application icon according to an embodiment of the present disclosure. In FIG. 4, the first active hotspot 210 is capable of displaying only four unread message application icons, whereas in practice, six unread message application icons may need to be displayed. In this case, the first active hotspot 210 may be clicked for activation, and the icon on the first active hotspot 210 may be dragged by a screen-slide operation. Still for example, the predetermined number may be four; when there are 10 unread message application icons, four unread message application icons are first displayed, then another four unread message application icons are displayed by a screen-slide operation, and the remaining two unread message application icons are displayed by another screen-slide operation in the same direction as the previous screen-slide operation. Nevertheless, the interface returns to a previous screen by sliding in a direction reverse to the direction of the previous screen-slide operation. This improves display speed of the icons and facilitates the operations.

During specific implementation, all application icons are added into a rollable View control, and all padding attributes are set in the padding attribute in a declaration to reach that a predetermined number of application icons (four icons) occupy the width of one screen. When the user presses the touch screen, and flings thereon, the action is triggered by one down action parameter MotionEvent ACTION_DOWN, a plurality of move action parameters ACTION_MOVE, and one up action parameter ACTION_UP. The action is defined as a fling event, and a next screen is displayed by each fling action. If the last screen is current displayed, the fling event may be ignored.

The pulling the unread message application icon by a slide operation may be understood as follows: When the number of existing unread message application icons is larger than the predetermined number, if an event of sliding the first activate hotspot 210 is received, the main thread pulls subsequent unread message application icons so as to be displayed on the first active hotspot 210.

It should be noted that the unread message application icons may be sequenced on the first active hotspot 210 based on the number of unread messages. For example, if the number of unread messages concerning short messages is larger than the number of unread messages concerning missed calls, the short message icon containing an unread message tag is displayed prior to the call icon containing a missed call tag. In addition, the unread message application icons may be sequenced based on a user-defined sequence, for example, based on a sequence of short messages, calls, QQ, MSN, and the like. When unread messages exist, corresponding application icons thereof are displayed based on the above sequence; otherwise, the corresponding application icons are hidden. Further, the unread message application icons may be sequenced based on time when the latest unread messages are received. For example, if the latest time of receiving a short message is 14:00 on Aug. 21, 2011, and the time of receiving the message concerning missed calls is 8:00 on Aug. 25, 2011, the unread message application icon corresponding to the call is displayed prior to the unread message application icon corresponding to the short message. Nevertheless, in practice, the unread message application icons may also be sequenced using another sequencing method, and such sequencing method is ready to persons of ordinary skill in the art, which is not described herein any further.

Besides, other solutions may also be employed for displaying unread message application icons. For example, when the number of unread message application icons is larger than a predetermined number, in addition to displaying the unread message application icons by the slide operation, a pull control may be set around the icons. To be specific, after a first screen of unread message application icons are displayed, if there are still remaining unread message application icons, the remaining unread message application icons may be pulled using a pull control for pulling unread message application icons on a next page. Correspondingly, if the interface needs to return to a previous screen of unread message application icons, the unread message application icons on the previous screen may also be pulled using a pull control for pulling unread message application icons on a previous page. During specific implementation, the icons may be pulled only by clicking the pull control.

Obviously, in the case where there are a large number of unread message application icons, screen-by-screen display of the unread message application icons is not limited to using the rollable view control setting or pull control setting. Other readily-envisaged methods for pulling the unread message application icons and displaying the icons screen-by-screen fall within the protection scope of the present disclosure.

After the unread message application icons are displayed using the above steps, the method further includes a step of previewing unread message through the unread message application icons. For details, reference may be made to FIG. 5.

Figure 5:
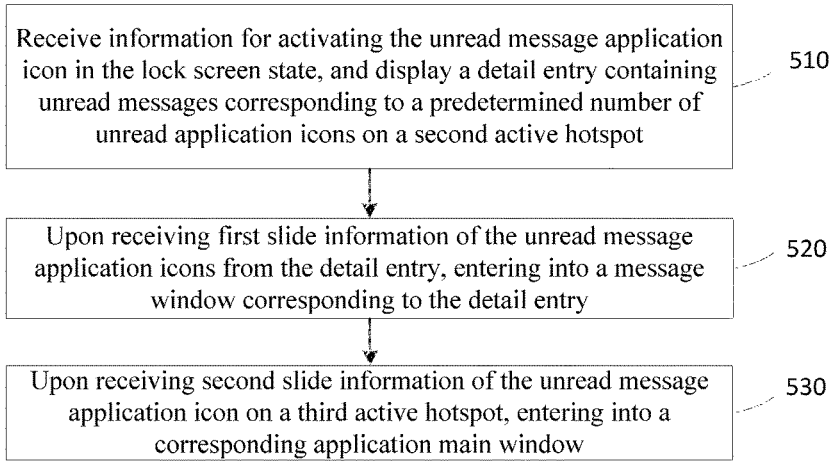
FIG. 5 is a flowchart of a method for displaying an unread message using an unread message application icon according to an embodiment of the present disclosure.

FIG. 5 is a flowchart of a method for displaying an unread message using an unread message application icon according to an embodiment of the present disclosure. The method includes the following steps:

Step 510: Receiving information for activating the unread message application icon in the lock screen state, and displaying a detail entry containing unread messages corresponding to a predetermined number of unread message application icon on a second active hotspot.

The detail entry may be unread-message-specific information such as keywords, reception time, and sender etc., which are not limited in the embodiments of the present disclosure.

Generally, an unread message application icon may be activated by a click, press-down, double-click, or drag operation. Since a predetermined number of unread messages need to be displayed, the second active hotspot is generally in the middle of the screen. Nevertheless, the second active hotspot may also be in other positions of the screen. Herein, the second active hotspot may be referenced to FIG. 2. The second active hotspot 220 illustrated in FIG. 2 may be used to store a predetermined number of detail entries, for example, three detail entries.

Generally, the unread message application icon herein is acquired by using the method for displaying an unread message application icons illustrated in FIG. 1. To be specific, in the lock screen state, the unread message application icon may be activated, such that in the lock screen state, the user may directly activate an unread message application icon on the first active hotspot (the first active hotspot 210 illustrated in FIG. 2) by clicking the unread message application icon. Analogously, when there are a large number of unread messages, these unread messages may be displayed screen-by-screen since the size of the screen of the mobile phone is limited. In this case, a threshold with respect to the number of unread messages to be displayed on one screen may be set, i.e., a predetermined number. It should be noted that the predetermined number herein may be the same as or different from the predetermined number specified in the method for displaying an unread message application icon. When the number of unread messages is larger than the predetermined number, a predetermined number of unread messages are displayed on a first screen, and a next predetermined number of unread messages or the remaining unread messages (in this case, the number of remaining unread messages is smaller than the predetermined number) are displayed on a second screen. Generally, for convenience of user's operations, a screen prompt is displayed at the bottom or other positions of the second active hotspot 220 as indicating which screen of unread messages are displayed currently. Switching between two neighboring screens may be implemented by sliding or clicking the screen prompt. The screen page prompt may generally include a forward screen prompt and a backward screen prompt. For example, in the case of the first screen of detail entries, a forward screen prompt is displayed only; whereas in the case of the last screen of detail entries, a backward screen prompt is displayed only. In other cases, a forward screen prompt and a backward screen prompt are both displayed. During specific implementation, the screen prompt may be implemented using a switching control.

During specific implementation, the sequence of the unread messages on the screen may be determined according to the time when the unread messages are received by the mobile phone. For example, latest unread messages are displayed in a top-to-bottom manner on a first screen, and earlier unread messages are displayed on a second screen.

In a preferred embodiment, to improve response speed of an unread message page, the method for displaying an unread message further includes pre-reading a next screen of unread messages using a background thread when previewing a current screen of unread messages on the second active hotspot 220. To be specific, when detail entries on the current screen are previewed, a background thread is started for pre-reading content of the detail entries of a next screen of unread messages. For example, when an $N^{th}$ screen is previewed, a background thread is started for pre-reading content of unread messages on an $(N+1)^{th}$ screen.

Step 520: Upon receiving first slide information of the unread message application icon from the detail entry, entering into a message window corresponding to the detail entry, the first slide information of the unread message application icon being generated by sliding the unread message application icon from the first active hotspot 210 to the detail entry. Generally, when sliding an unread message application icon from the first active hotspot 210 to the detail entry, the unread message application icon needs to be slid to the detail entry and then released. That is to say, the ending point of the slide route on the touch screen needs to be on the detail entry, and first slide information of the unread message application icon is generated once the icon is released.

In a specific embodiment, when an application icon containing an unread short message exists, a detail entry containing a predetermined number of unread short messages may be displayed on the second active hotspot 220; when the application icon is dragged from the first active hotspot 210 to the detail entry, first slide information of the unread message application icon is generated, and subsequently the screen is unlocked and directly redirected to a short message-based chat window corresponding to the detail entry. Nevertheless, the first slide information of the unread message application icon may also be acquired in other manners. For example, the first slide information of the unread message application icon may be generated by operating the unread message application icon and detail entry using such actions as clicking or double-clicking. The corresponding detail entry may identify the generated unread message application icon. The specific action may be set according to actual requirements.

Step 530: Upon receiving second slide information of the unread message application icon on a third active hotspot, entering into a corresponding application main window, the second slide information of the unread message application being generated by sliding the unread message application icon from the first active hotspot 210 to the third active hotspot. Generally, when sliding an unread message application icon from the first active hotspot 210 to the third active hotspot, the unread message application icon needs to be slid to the third active hotspot and then released. That is to say, the ending point of the slide route on the touch screen needs to be on the third active hotspot, and second slide information of the unread message application icon is generated once the icon is released.

In a specific embodiment, when an application icon containing a missed call exists, and after the second slide information of the unread message application is received on the third active hotspot, the screen is unlocked, and an application main window with respect to missed calls is entered into. Herein, the third active hotspot may be referenced to the third active hotspot 230 illustrated in FIG. 2. During specific implementation, the second slide information of the unread message application icon received on the third active hotspot 230 is generally generated after the user slides the unread message application icon from the first active hotspot 210 to the third active hotspot 230. After the user slides on the screen, the screen of the mobile phone is unlocked. Nevertheless, the second slide information of the unread message application icon may also be acquired in other manners. For example, the second slide information of the unread message application icon may be generated by operating the unread message application icon using such actions as clicking or double-clicking. The specific action may be set according to actual requirements.

It should be noted that the operation for generating first slide information of an unread message application icon is different from that for generating the second slide information of the unread message application icon, which facilitates identification of the two types of information. For example, the first slide information of the unread message application icon is generated by sliding the unread message application icon to the detail entry, and the second slide information of the unread message application icon is generated by sliding the unread message application icon from the first active hotspot 210 to the third active hotspot 230. Still for example, the first slide information of the unread message application icon is generated by sequentially clicking the unread message application icon and the detail entry, and the second slide information of the unread message application icon is generated by sliding the unread message application icon from the first active hotspot 210 to the third active hotspot 230.

In conclusion, according to the method for displaying an unread message provided in the present disclosure, an unread message application icon may be directly acquired in a lock screen state, and unread messages are pulled using multiple threads, thereby improving interface response speed. In addition, an unread message application icon may be directly displayed on the screen in the lock screen state other than on an unlocked screen, thereby making reading of subsequent unread messages more convenient and quick. Further, after the unread message application icon is displayed, a corresponding message window is directly displayed by dragging the unread message application icon to a detail entry on the second active hotspot 220, and a corresponding application main window is displayed by dragging the unread message application icon to a third active hotspot 230. In this way, direct access to the message is achieved, which is convenient and quick.

Figure 6:
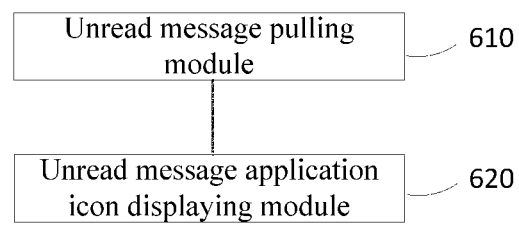
FIG. 6 is a schematic structural diagram of a system for displaying an unread message according to an embodiment of the present disclosure.

FIG. 6 is a schematic structural diagram of a system for displaying an unread message according to an embodiment of the present disclosure. The system includes an unread message pulling module 610 and an unread message application icon displaying module 620.

The unread message pulling module 610 is configured to pull an unread message in a unlock screen state.

The unread message application icon displaying module 620 is configured to: display a corresponding unread message application icon on a first active hotspot when an unread message exists, and otherwise, hide the unread message application icon. For details of the first active hotspot, reference may be made to FIG. 2, which is not described herein any further.

Generally, when a mobile phone is installed with a large number of applications, many applications have unread messages after the screen of the mobile phone is unlocked. However, the size of the screen is limited, and the size of the corresponding first active hotspot 210 is also limited. Therefore, for convenience of user's operations, generally the unread message application icon displaying module 620 is configured to: when the number of unread message application icons is larger than a predetermined number, pull more unread message application icons by a screen-slide operation.

According to the system illustrated in FIG. 6, the unread message application icon may be displayed in the lock screen state. If the unread message application icon needs to be further previewed, the system needs to further include a message window displaying module and a main window displaying module. For details, reference may be made to FIG. 7.

Figure 7:
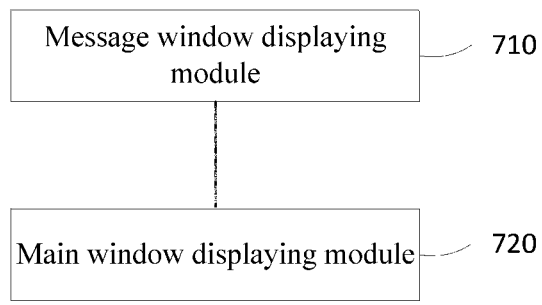
FIG. 7 is a schematic structural diagram of a system for displaying an unread message according to another embodiment of the present disclosure.

FIG. 7 is a schematic structural diagram of a system for displaying an unread message according to an embodiment of the present disclosure. The system includes a message window displaying module 710 and a main window displaying module 720.

The message window displaying module 710 is configured to: receive information for activating the unread message application icon in the lock screen state, and display a detail entry containing unread messages corresponding to a predetermined number of unread message application icon on a second active hotspot 220; and receive first slide information of the unread message application icon from the detail entry, and enter into a message window corresponding to the detail entry, the first slide information of the unread message application icon being generated by sliding the unread message application icon from the first active hotspot 210 to the detail entry.

In a specific embodiment, when an application icon containing an unread short message exists, a detail entry containing a predetermined number of unread short messages may be displayed on the second active hotspot 220; after the application icon is dragged to the detail entry, the screen is unlocked and directly redirected to a short message-based chat window corresponding to the detail entry. In a preferred embodiment, for a higher response speed of an unread message page, the system for displaying an unread message further includes a detail entry pre-reading module, which is configured to start a background thread for pre-reading content of the detail entries of a next screen of unread messages. For example, when an $N^{th}$ screen is previewed, a background thread is started for pre-reading content of unread messages on an $(N+1)^{th}$ screen.

The main window displaying module 720 is configured to: upon receiving second slide information of the unread message application icon on a third active hotspot, enter into a corresponding application main window, the second slide information of the unread message application being generated by sliding the unread message application icon from the first active hotspot 210 to the third active hotspot.

In a specific embodiment, when an application icon containing a missed call exists, and after the second slide information of the unread message application is received on the third active hotspot, the screen is unlocked, and an application main window with respect to missed calls is displayed. Herein, the third active hotspot herein may be referenced to the third active hotspot 230 illustrated in FIG. 2. During specific implementation, the second slide information of the unread message application icon received on the third active hotspot 230 is generally generated after the user slides the unread message application icon from the first active hotspot 210 to the third active hotspot 230. After the user slides on the screen, the screen of the mobile phone is unlocked.

It should be noted that, the system for displaying an unread message provided in the above-described embodiments is described by only using division of the above functional modules as an example. In practice, the functions may be assigned to different functional modules for implementation as required. To be specific, the internal structure of the apparatus is divided into different functional modules to implement all or part of the above-described functions. In addition, the system for displaying an unread message is based on the same inventive concept as the method for displaying an unread message provided in the embodiments of the present disclosure, where the specific implementation is elaborated in the method embodiments, which is not described herein any further.

In conclusion, according to the system for displaying an unread message provided in the present disclosure, an unread message application icon may be directly acquired in a lock screen state, and unread messages are pulled using multiple threads, thereby improving interface response speed. In addition, an unread message application icon may be directly displayed on the screen in the lock screen state other than on an unlocked screen, thereby making reading of subsequent unread messages more convenient and quick. Further, after the unread message application icon is displayed, a corresponding message window is directly displayed by dragging the unread message application icon to a detail entry on the second active hotspot 220, and a corresponding application main window is displayed by dragging the unread message application icon to a third active hotspot 230. In this way, direct access to the message is achieved, which is convenient and quick.

Persons of ordinary skill in the art should understand that all or part of steps of the preceding methods may be implemented by hardware or hardware following instructions of programs. The programs may be stored in a non-transitory computer-readable storage medium and may be executed by at least one processor. The storage medium may be a read-only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for displaying unread message in a lock screen state, comprising: pulling an unread message in the lock screen state;
    displaying a corresponding unread message application icon on a first active hotspot of a lock screen when an unread message exists, and hiding the unread message application icon when the unread message does not exist, the unread message application icon referring to icon of application having unread message; and displaying the unread message through performing operation of the unread message application icon with the lock screen locked; wherein the displaying a corresponding unread message application icon on a first active hotspot on a lock screen comprises: displaying all unread message application icons on the first active hotspot if the number of unread message application icons is smaller than a predetermined number; and otherwise, displaying a predetermined number of unread message application icons on the first active hotspot, and pulling more unread message application icons by receiving information for activating screen-slide, wherein the method is performed by a processor.

2. The method according to claim 1, wherein the pulling an unread message comprises:
    establishing an independent pull thread for each application; and
    pulling, by each pull thread, the unread message of a corresponding application.

3. The method according to claim 1, wherein the previewing unread message through performing operation of the unread message application icons with the lock screen locked comprises:
receiving information for activating the unread message application icon in the lock screen state, and displaying a detail entry containing unread messages corresponding to a predetermined number of unread message application icon on a second active hotspot of the lock screen; and
upon receiving first slide information of the unread message application icon from the detail entry, entering into a message window corresponding to the detail entry, the first slide information of the unread message application icon being generated by sliding the unread message application icon from the first active hotspot to the detail entry.

4. The method according to claim 3, wherein after the displaying a detail entry containing unread messages corresponding to a predetermined number of unread message application icon on a second active hotspot, the method further comprises:
pre-reading next-screen unread messages using a background thread when previewing current-screen unread messages on the second active hotspot.

5. The method according to claim 1, wherein the previewing unread message through performing operation of the unread message application icons with the lock screen unlocked comprises:
upon receiving second slide information of the unread message application icon on a third active hotspot, entering into a corresponding application main window, the second slide information of the unread message application icon being generated by sliding the unread message application icon from the first active hotspot to the third active hotspot.

6. A system for displaying unread message in a lock screen state, comprising: an unread message pulling module, configured to pull an unread message in the lock screen state; an unread message application icon displaying module, configured to: display a corresponding unread message application icon on a first active hotspot on a lock screen when an unread message exists; and hide the unread message application icon when the unread message does not exist, the unread message application icon referring to icon of application having unread message; and a window displaying module, configured to: displaying the unread message through performing operation of the unread message application icon with the lock screen locked, wherein the unread message application icon displaying module is configured to:
display all unread message application icons on the first active hotspot if the number of unread message application icons is smaller than a predetermined number; and otherwise, display a predetermined number of unread message application icons on the first active hotspot, and pull more unread message application icons by receiving information tor activating screen-slide, wherein at least one of the unread message pulling module, the unread message application icon displaying module, or the window displaying module is implemented by a processor.

7. The system according to claim 6, wherein the unread message pulling module is configured to:
establish an independent pull thread for each application; and
pull, using each pull thread, the unread message of a corresponding application.

8. The system according to claim 6, wherein the window displaying module is a message main window displaying module,
the message window displaying module, configured to:
receive information for activating the unread message application icon in the lock screen state, and display a detail entry containing unread messages corresponding to a predetermined number of unread message application icons on a second active hotspot; and
upon receiving first slide information of the unread message application icon from the detail entry, enter into a message window corresponding to the detail entry, the first slide information of the unread message application icon being generated by sliding the unread message application icon from the first active hotspot to the detail entry.

9. The system according to claim 8, wherein the message main window displaying module further comprises:
a detailed item pre-reading module, configured to pre-read next-screen unread messages using a background thread when previewing current-screen unread messages on the second active hotspot.

10. The system according to claim 6, wherein the window displaying module is a main window displaying module,
the main window displaying module, configured to: upon receiving second slide information of the unread message application icon on a third active hotspot, enter into a corresponding application main window, the second slide information of the unread message application icon being generated by sliding the unread message application icon from the first active hotspot to the third active hotspot.

* * * * *